United States Patent
Andersson et al.

(10) Patent No.: US 9,203,278 B2
(45) Date of Patent: Dec. 1, 2015

(54) MOTOR MOUNTING BRACKET

(75) Inventors: Ake Andersson, Vasteras (SE); Gustav Borg, Vasteras (SE)

(73) Assignee: ABB Technology Ltd (CH)

( * ) Notice: Subject to any disclaimer, the term of this patent is extended or adjusted under 35 U.S.C. 154(b) by 65 days.

(21) Appl. No.: 13/234,922

(22) Filed: Sep. 16, 2011

(65) Prior Publication Data

US 2012/0007457 A1 Jan. 12, 2012

Related U.S. Application Data

(63) Continuation of application No. PCT/EP2009/053211, filed on Mar. 18, 2009.

(51) Int. Cl.
   *H02K 5/00* (2006.01)
   *H02K 5/26* (2006.01)

(52) U.S. Cl.
   CPC ............. *H02K 5/26* (2013.01); *Y10T 29/49009* (2015.01)
   USPC .............................................. 310/89; 310/91

(58) Field of Classification Search
   CPC .............. H02K 5/00; H02K 5/04; H02K 1/18
   USPC .............. 310/89, 91; 248/661–664, 674, 558, 248/639, 669
   See application file for complete search history.

(56) References Cited

U.S. PATENT DOCUMENTS

| | | | | |
|---|---|---|---|---|
| 3,326,503 A * | 6/1967 | Bade | | 248/672 |
| 3,746,289 A * | 7/1973 | Johnsen | | 310/91 |
| 3,870,909 A * | 3/1975 | Pangburn | | 310/91 |
| 4,033,531 A * | 7/1977 | Levine | | 248/558 |
| 4,138,079 A * | 2/1979 | Ehret et al. | | 248/558 |
| 4,572,474 A * | 2/1986 | Derlich | | 248/639 |
| 4,859,889 A * | 8/1989 | Andrews et al. | | 310/89 |
| 5,080,319 A * | 1/1992 | Nielsen | | 248/669 |
| 5,696,416 A * | 12/1997 | Baker et al. | | 310/91 |
| 7,021,599 B2* | 4/2006 | DeGrazia et al. | | 248/645 |
| 7,028,970 B1* | 4/2006 | Wiseman | | 248/669 |
| 7,663,868 B1* | 2/2010 | Lam | | 361/679.06 |
| 2006/0091751 A1* | 5/2006 | Gaul | | 310/91 |

FOREIGN PATENT DOCUMENTS

FR 2327665 A1 5/1977
GB 1248957 10/1971

OTHER PUBLICATIONS

International Search Report and Written Opinion of the International Searching Authority; PCT/EP2009/053211; Dec. 23, 2009; 11 pages.

* cited by examiner

*Primary Examiner* — Naishadh Desai
(74) *Attorney, Agent, or Firm* — Whitmyer IP Group LLC

(57) ABSTRACT

A mounting bracket for an electrical motor having two mounting interfaces at different distances from the bottom surface to be used in combination with two stator frames of different sizes. A method for obtaining equal shaft heights for electrical motors having stator frames of different sizes.

14 Claims, 2 Drawing Sheets

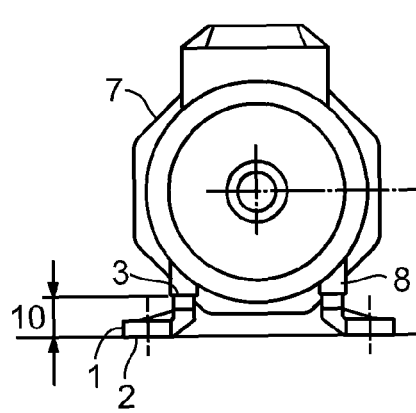
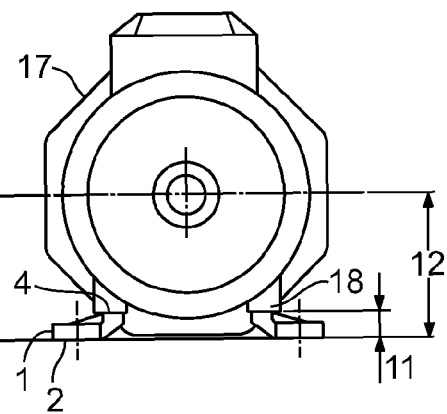
Fig. 3a　　　　　　　　　　Fig. 3b
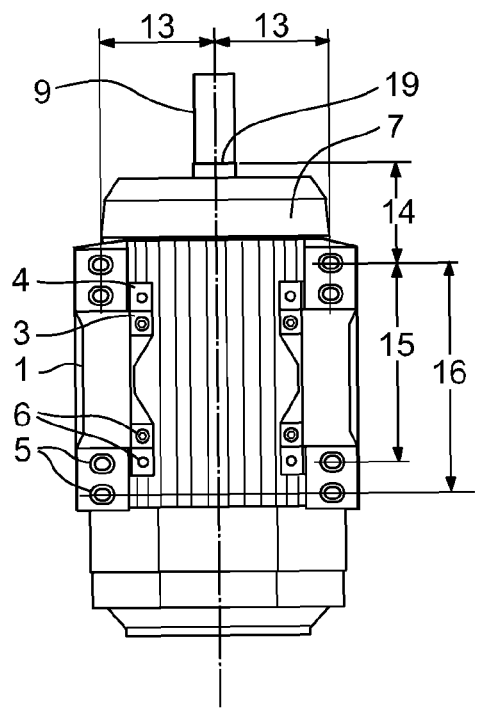
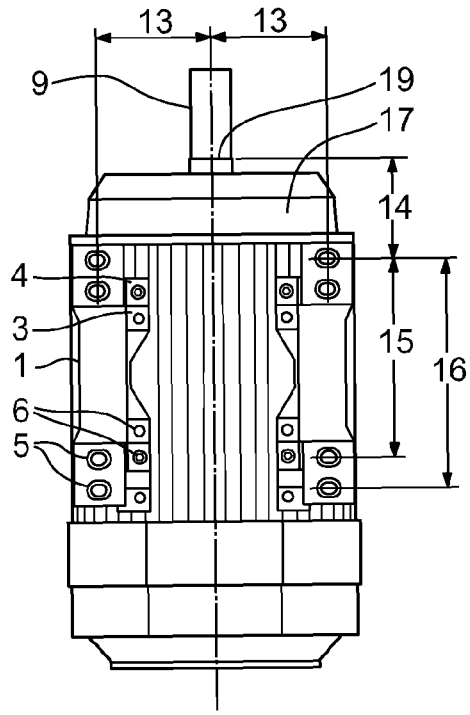
Fig. 4a　　　　　　　　　　Fig. 4b

MOTOR MOUNTING BRACKET

CROSS-REFERENCE TO RELATED APPLICATIONS

The present application is a continuation of pending International Patent Application PCT/EP2009/053211 filed on Mar. 18, 2009, which designates the United States, and the content of which is incorporated herein by reference.

FIELD OF THE INVENTION

The present invention relates to a motor mounting bracket for an electrical motor. It also relates to a method for obtaining equal shaft heights for electrical motors having stator frames of different sizes.

BACKGROUND OF THE INVENTION

A stator frame constitutes the main body of an electrical motor and comprises interface surfaces for connecting other components and fixing them in position. The motor typically stands on mounting brackets to be securely mounted to a stationary support structure such as floor, work table, etc. The mounting brackets are attached to the underside of the stator frame, the stator frame comprising abutments to be supported on corresponding mounting interfaces on the mounting brackets. The shaft height of the motor is thereby partly defined by the mounting bracket height. The shaft heights of electrical motors are standardized, and there are motor series having a plurality of different stator frame sizes with equal shaft height. This means that a motor with a certain shaft height can be based on either a larger or a smaller stator frame. To meet the correct height according to the intended standards, different sizes of mounting brackets are needed. Motors based on bigger stator frames need lower mounting brackets and motors based on smaller stator frames need higher mounting brackets.

The mounting brackets typically have through holes for attachment to some support structure (floor) and to the stator frame, respectively. Not only the shaft height but also the pattern the through holes define for securing the mounting brackets to the support structure is standardized as well as the position of the hole pattern in relation to the motor shaft. A motor shaft typically comprises a shoulder separating two different shaft diameters, and the standards define the position of the hole pattern in relation to the axis of the motor shaft and the shoulder. Each stator frame size has a corresponding unique mounting bracket design, and the use of a correct mounting bracket article leads to a correct shaft height and to a correct hole pattern.

Since the mounting brackets are unique for each stator frame size the number of mounting bracket articles becomes large.

SUMMARY OF THE INVENTION

One object of the invention is to reduce the number of mounting bracket articles for a series of electrical motors.

A further object of the invention is to provide an improved method for obtaining a substantially equal shaft height for electrical motors having stator frames of different sizes.

These objects are achieved by the device according to the claims.

The invention is based on the realization that the use of unique mounting brackets for each stator frame size leads to an unnecessary large number of mounting bracket articles. It is possible to combine two or more unique motor mounting bracket designs into one such that the resulting mounting bracket can be used in combination with two or more stator frames of different sizes.

According to a first aspect of the invention, there is provided a mounting bracket for an electrical motor, the mounting bracket comprising a bottom surface configured to be mounted to a support structure, a first mounting interface configured to support a stator frame of a first size, said first mounting interface having a first distance from the bottom surface, and a second mounting interface configured to support a stator frame of a second size, said second mounting interface having a second distance from the bottom surface, the second distance being different from the first distance.

When dimensioned appropriately, a mounting bracket comprising two mounting interfaces at different distances from the bottom surface can be used in combination with two stator frames of different sizes in order to obtain an equal shaft height. Two conventional mounting bracket articles can thereby be replaced by one mounting bracket article according to the invention.

The bottom surface may comprise a substantially planar section, and the first and second mounting interfaces may comprise substantially planar sections which are substantially parallel with the substantially planar section of the bottom surface. A planar bottom surface together with planar and parallel mounting interfaces constitutes a component with a simple geometry and steady structure. Planar bottom surface is the most natural choice for supporting the motor on a floor or other planar structure, but the shape of the bottom surface can be modified to correspond to the intended support structure. The bottom surface can also comprise an interconnecting feature the shape of which is configured to interconnect with a counterpart at the support structure to thereby ensure a correct positioning of the mounting bracket in relation to the support structure. The mounting interfaces and the stator frame abutments can comprise similar pairs of interconnecting features to ensure a correct positioning of the mounting bracket in relation to the stator frame. The interconnecting features can e.g. comprise a hole, a pin, a cone, a spherical surface or an inclined planar surface, the counterpart comprising a corresponding negative feature.

The mounting bracket may comprise at least three mounting interfaces at different distances from the bottom surface, each mounting interface being configured to support a stator frame. The number of mounting interfaces is not limited to two but there may be any number of them. In practice the need of different mounting interfaces is limited by the number of different stator frame sizes in a motor series.

The mounting bracket may comprise a bottom hole through the bottom surface. A simple and universal attachment of the mounting bracket to the support structure is enabled when the mounting bracket is provided with a hole through the bottom surface.

The mounting bracket may comprise a plurality of bottom holes, and the positions of the bottom holes may correspond to a hole pattern according to an industrial standard. The hole patterns of the bottom holes are standardized and the products are to follow a standard to be widely applicable. In case there are several different standards or one standard comprising alternative hole patterns, the number and positions of the bottom holes can be configured to correspond several alternative standard hole patterns. The industrial standard to be followed may be an IEC (International Electrotechnical Commission) standard or an NEMA (National Electrical Manufacturers Association) standard. The IEC standard and the NEMA standard are widely used and preferable standards covering the field of electrical motors.

Each of the mounting interfaces may be divided in at least two portions. A stable support is obtained when the mounting interfaces are divided in more than one portions.

The mounting bracket may comprise an interface hole through each interface. A simple and universal attachment of the mounting bracket to the stator frame is enabled when the mounting bracket is provided with a hole through each interface.

According to a second aspect of the invention, there is provided a motor assembly comprising a stator frame, and a mounting bracket according to the first aspect of the invention, wherein the stator frame is supported on one of the mounting interfaces of the mounting bracket. The mounting bracket according to the first aspect of the invention fulfils its function only in combination with a stator frame. The stator frame has to be configured to be supported on the mounting bracket i.e. the stator frame has to comprise an abutment that coincides with one of the mounting interfaces. The stator frame and the mounting bracket are thereby inter-relater products that constitute an entity.

The motor assembly may comprise a plurality of identical mounting brackets, the stator frame being supported on one of the mounting interfaces of each mounting bracket. The number of mounting bracket articles is further reduced when all the mounting brackets comprised in a motor assembly are identical. The use of identical mounting brackets is enabled by making the hole patterns symmetrical. The remaining structure of the mounting bracket may also be symmetrical.

The assembly may further comprise a motor shaft having a shoulder, and the mounting brackets may comprise a plurality of bottom holes, and the positions of the bottom holes in relation to the axis of the motor shaft and the position of the shoulder may correspond to an industrial standard. The positions of the bottom holes in relation to the axis of the motor shaft and the position of the shoulder on the motor shaft are standardized and the products are to follow a standard to be widely applicable. In case there are several different standards or one standard comprising a plurality of alternatives, the number and positions of the bottom holes can be configured to correspond several alternative standards. The industrial standard to be followed may be an IEC standard or a NEMA standard.

According to a third aspect of the invention, there is provided a combination comprising two motor assemblies according to the second aspect of the invention, wherein the first motor assembly comprises a first stator frame of a first size, and the second motor assembly comprises a second stator frame of a second size, the first size being different from the second size, the first and the second stator frames being supported on mounting interfaces having different distances from the corresponding bottom surfaces, the first and the second motor assemblies having a substantially equal shaft height, the shaft height being defined by the distance between the axis of the motor shaft and the bottom surface.

According to a fourth aspect of the invention, there is provided a method for obtaining a substantially equal shaft height for a first and second electrical motors having stator frames of different sizes, the method comprising: a) providing a first and second stator frames of different sizes, b) providing a first and second mounting brackets, each of the first and second mounting brackets comprising a bottom surface configured to be mounted to a support structure, and a first and second mounting interfaces at different distances from the bottom surface, each mounting interface being configured to support a stator frame, c) supporting the first stator frame on the first mounting interface of the first mounting bracket, and d) supporting the second stator frame on the second mounting interface of the second mounting bracket. An equal shaft height is obtained for two stator frames of different sizes in combination with a single mounting bracket design when the stator frame abutments and the distances of the corresponding mounting interfaces from the bottom surface are appropriately dimensioned.

BRIEF DESCRIPTION OF THE DRAWINGS

The invention will be explained in greater detail with reference to the accompanying drawings, wherein FIGS. 3a and 3b shows two stator frames of different sizes having the same shaft height, and FIGS. 4a and 4b shows the definition of hole pattern dimensions in a bottom view of two motor assemblies with different stator frame sizes.

DETAILED DESCRIPTION OF THE INVENTION

Figure 1:
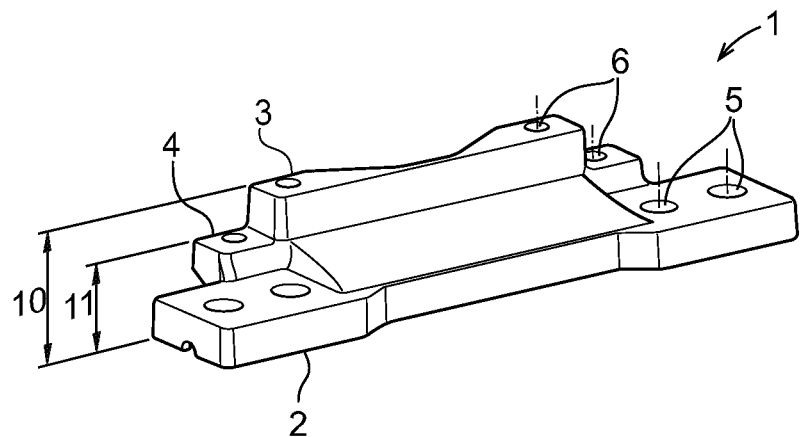
FIG. 1 shows a mounting bracket according to one embodiment of the invention.

FIG. 1 shows a mounting bracket 1 according to one embodiment of the invention. The mounting bracket 1 comprises a bottom surface 2 for supporting the motor assembly to a support structure. A first mounting interface 3 has a first distance 10 from the bottom surface 2, and a second mounting interface 4 has a second distance 11 from the bottom surface 2. The first and second mounting interfaces 3, 4 are configured to support stator frames 7, 17 of different sizes. The mounting interfaces 3, 4 do not need to be planar nor horizontal as depicted in FIG. 1 but they can be of any form suitable for supporting a stator frame 7, 17. Also the bottom surface 2 can be of any form suitable for supporting the motor assembly to a stationary support structure. When the bottom surface 2 and the mounting interfaces 3, 4 are not parallel, it is to be understood that with the distances 10, 11 between the bottom surface 2 and the mounting interfaces 3, 4 average distances between the two are meant.

The mounting bracket 1 is provided with four bottom holes 5 through the bottom surface 2 for attachment of the mounting bracket 1 to a support structure. The positions of the bottom holes 5 correspond to a hole pattern according to IEC standard. The first and the second mounting interfaces 3, 4 are divided in two portions, each portion comprising an interface hole 6 for attachment of the mounting bracket 1 to the stator frame 7, 17. Both the bottom holes 5 and the interface holes 6 are positioned symmetrically in such a way that there exists a plane of symmetry for the hole pattern. Also the remaining structure of the mounting bracket 1 is symmetrical.

Figure 2:
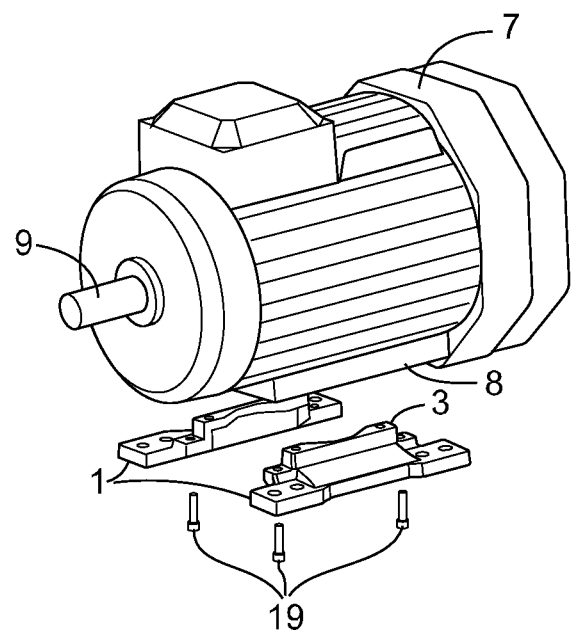
FIG. 2 shows a motor assembly comprising a stator frame supported on two mounting brackets of the type depicted in FIG. 1.

FIG. 2 shows an assembly comprising two identical mounting brackets 1 attached with bolts 19 to a bottom of a stator frame 7. The stator frame 7 has abutments 8 that coincide with the first mounting interfaces 3 of the mounting brackets 1. The hole patterns of the mounting brackets 1 are symmetrical and thereby two identical and interchangeable mounting brackets 1 can be used. In the assembly according to FIG. 2 there are two mounting brackets 1 of the type depicted in FIG. 1, but depending on the construction of the mounting bracket 1 a suitable number of mounting brackets 1 may be any number different from two, such as one, three or four.

FIG. 3 shows two electrical motors both of which are supported on identical mounting brackets 1 of the type depicted in FIG. 1. The stator frame 7 of FIG. 3a is smaller than the stator frame 17 of FIG. 3b. The stator frame 7 of FIG. 3a is supported on the mounting interface 3 having a longer distance 10 from the bottom surface 2, while the stator frame 17 of FIG. 3b is supported on the mounting interface 4 having a shorter distance 11 from the bottom surface 2. Together with the dimensions of the abutments 8, 18 the mounting bracket dimensions cause the shaft heights 12 of the two motors to become substantially equal.

According to FIG. 4, the positions of the bottom holes 5 in relation to the axis of the motor shaft 9 and a shoulder 19 separating two different shaft diameters, corresponding to the distances 13, 14, 15 and 16, are configured to be in compliance with an industrial standard such as an IEC standard or NEMA standard.

The invention is not limited to the embodiments shown above, but the person skilled in the art may, of course, modify them in a plurality of ways within the scope of the invention as defined by the claims. Thus, the invention is not limited to electrical motors, but may also be applied to other types of motors.

What is claimed is:

1. A mounting bracket for an electrical motor, the mounting bracket comprising:
    a bottom surface configured to be mounted to a support structure, and
    a first mounting interface configured to support a stator frame of a first size, said first mounting interface having a first support surface that is disposed a first distance from the bottom surface, and
    a second mounting interface configured to support a stator frame of a second size, said second mounting interface having a second support surface that is disposed a second distance from the bottom surface, the second distance being different from the first distance,
    said first support surface and said second support surface being different surfaces that are substantially parallel to the bottom surface,
    said bracket being adapted to provide concurrently said first mounting interface and said second mounting interface.

2. The mounting bracket of claim 1, wherein the bottom surface comprises a substantially planar section, and wherein the first and second support surfaces comprise substantially planar sections which are substantially parallel with the substantially planar section of the bottom surface.

3. The mounting bracket of claim 1, wherein the mounting bracket comprises at least three mounting interfaces at different distances from the bottom surface, each mounting interface being configured to support a stator frame.

4. The mounting bracket of claim 1, wherein the mounting bracket comprises a bottom hole through the bottom surface.

5. The mounting bracket of claim 4, wherein the mounting bracket comprises a plurality of bottom holes, and
    wherein the positions of the bottom holes correspond to a hole pattern according to an industrial standard.

6. The mounting bracket of claim 1, wherein all of the mounting interfaces are divided in at least two portions.

7. The mounting bracket of claim 1, wherein the first and second mounting interfaces each have at least one interface hole.

8. A motor assembly comprising:
    a stator frame having either a first size or a second size, and
    a mounting bracket, the mounting bracket including
    a bottom surface configured to be mounted to a support structure,
    a first mounting interface configured to support the stator frame of the first size, said first mounting interface having a first support surface that is disposed a first distance from the bottom surface, and
    a second mounting interface configured to support the stator frame of the second size, said second mounting interface having a second support surface that is disposed a second distance from the bottom surface, the second distance being different from the first distance,
    said first support surface and said second support surface being different surfaces that are substantially parallel to the bottom surface,
    said bracket being adapted to provide concurrently said first mounting interface and said second mounting interface,
    wherein the stator frame is supported on one of the mounting interfaces of the mounting bracket.

9. The motor assembly of claim 8, wherein the motor assembly comprises a plurality of identical mounting brackets, and wherein the stator frame is being supported on one of the mounting interfaces of each mounting bracket.

10. The motor assembly of claim 9, further comprising a motor shaft having a shoulder.

11. The motor assembly of claim 9, wherein the mounting brackets comprise a plurality of bottom holes and wherein the positions of the bottom holes in relation to the axis of the motor shaft and the position of the shoulder correspond to an industrial standard.

12. The motor assembly of claim 11, wherein the industrial standard is an IEC standard or an NEMA standard.

13. A combination of a first motor assembly and second motor assembly, the combination comprising:
    the first motor assembly having a first stator frame of a first size, and
    the second motor assembly having a second stator frame of a second size, the first size being different from the second size,
    the first stator frame and the second stator frame being supported respectively on first and second mounting interfaces of identical mounting brackets, said mounting brackets each being adapted to provide concurrently said first and second mounting interfaces, said first mounting interface of each mounting bracket having a first support surface that is disposed a first distance from a corresponding bottom surface of the respective mounting bracket, said second mounting interface of each mounting bracket having a second support surface that is disposed a second, different distance from the corresponding bottom surface of the respective mounting bracket, said first and said second support surfaces of each mounting bracket being different surfaces that are substantially parallel to the corresponding bottom surface of the respective mounting bracket,
    the first and the second motor assemblies having a substantially equal shaft height, the shaft height being defined by the distance between an axis of the motor shaft and the bottom surface.

14. A method for obtaining a substantially equal shaft height for a first and second electrical motors having stator frames of different sizes, the method comprising the steps of:
    providing a first and second stator frames of different sizes;
    providing a first and second mounting brackets, said first and second mounting brackets are idntical, each of the first and second mounting brackets including a bottom surface configured to be mounted to a support structure, and a first mounting interface having a first support surface and second mounting interface having a second support surface, the first and second support surfaces disposed at different distances from the bottom surface, each mounting interface being configured to support a stator frame, said first support surface and said second support surface being different surfaces that are substantially parallel to the bottom surface, said brackets each being adapted to provide concurrently said first and second mounting interfaces;

supporting the first stator frame on the first mounting interface of the first mounting bracket; and supporting the second stator frame on the second mounting interface of the second mounting bracket.

* * * * *